July 10, 1934.    C. E. FURGASON    1,966,290
OVERRUNNING CLUTCH
Original Filed March 19, 1928
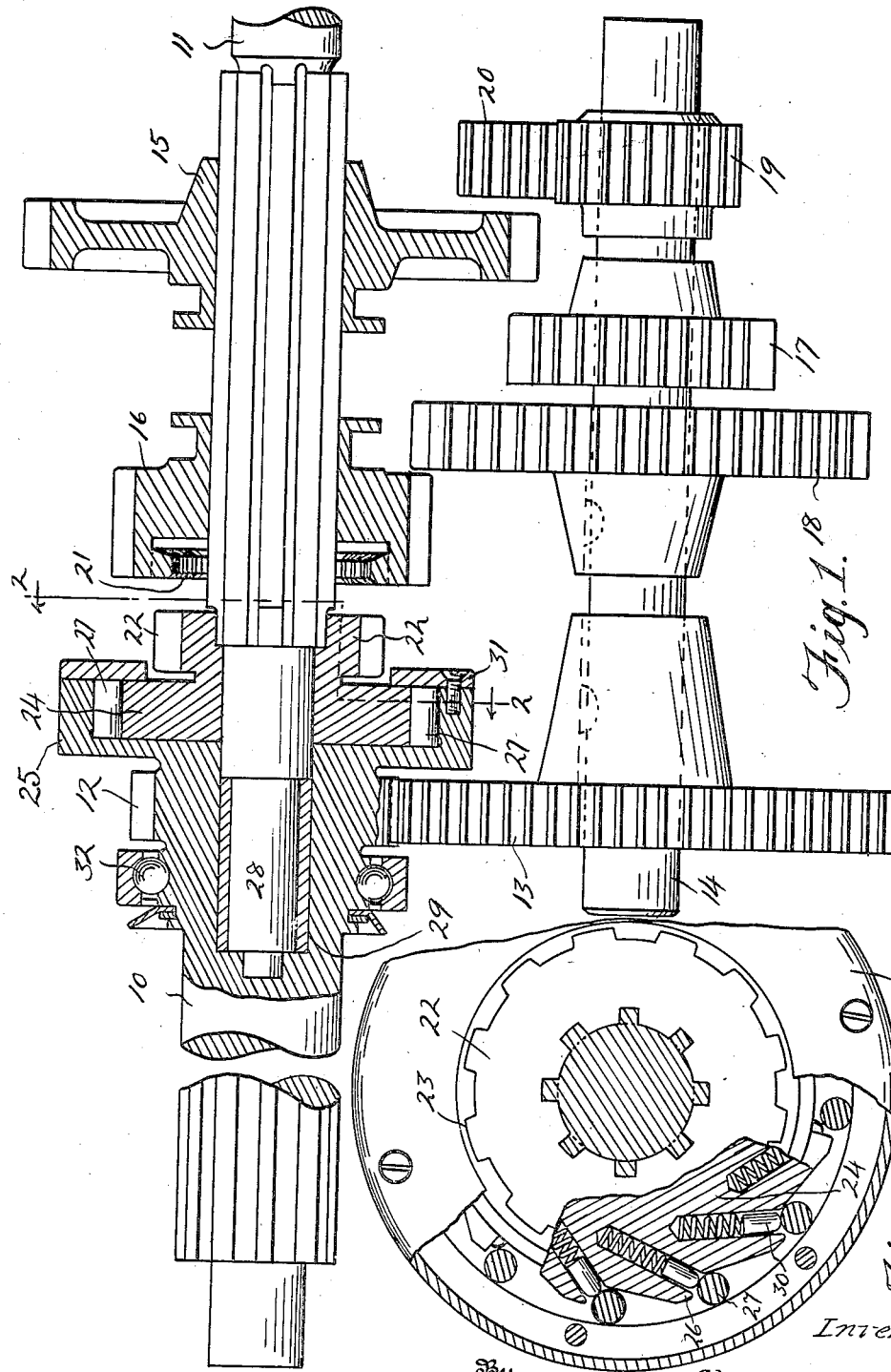
Inventor
Claude E. Furgason
By
Attys Patented July 10, 1934

1,966,290

UNITED STATES PATENT OFFICE 1,966,290

OVERRUNNING CLUTCH

Claude E. Furgason, Lansing, Mich., assignor, by mesne assignments, to L. G. S. Devices Corporation, a corporation of Indiana Application March 19, 1928, Serial No. 262,975
Renewed August 21, 1933

12 Claims. (Cl. 192—48)

This invention relates to transmission or change speed gears and more particularly to improvements therein providing means for permitting the driven shaft of the gearing, when the gears are shifted for direct drive, to travel faster than the driving shaft.

The invention finds particular utility, although it is not necessarily so limited, when used in connection with motor vehicles because when thus employed this invention permits the vehicle to coast or travel under its own momentum independently of the engine.

In change speed transmission gearing of the character with which this invention is associated there is provided a driving shaft, a driven shaft and a counter shaft together with gears drivingly connecting said driving shaft to said counter shaft and shiftable gears, for instance on said driven shaft, engageable with said gears on said counter shaft for driving said driven shaft at variable speeds. Direct or high speed is usually provided by directly coupling the driving shaft to the driven shaft and in accordance with this invention a one way clutch is interposed between the driving shaft and the member carried thereby and used in direct drive whereby during high speed or direct drive the driven shaft may rotate relatively faster or independently of the driving shaft. By arranging the one way clutch between the driving shaft and the direct drive member carried thereby the drive through the remaining gears is unaffected. Thus in first and second speeds the motor may be used as a brake as is customary with motor vehicles.

Other advantages are obtainable with the present invention, it being found that the gears may be shifted into high speed or direct drive more easily and furthermore that the provision of this one way clutch between the driving and driven shafts eliminates what is commonly known as "bucking". This bucking is usually the result of alternating variances in the speed of the motor and the vehicle wherein momentarily the motor is running faster than the vehicle and vice versa. With the present invention this objection is entirely eliminated and a much smoother movement of the vehicle results.

It should be stated that the general arrangement just described is shown and described in my copending application for Transmission or change speed gears Ser. No. 206,636 filed July 18, 1927 and that the present application is directed to the particular arrangement of the clutch with respect to driving and driven shafts whereby a greater clutching surface is provided, thus greatly increasing the efficiency of the whole construction.

The several objects, advantages and novel details of construction of this invention will be made more apparent as this description proceeds, especially when considered in connection with the accompanying drawing wherein:

Figure 1 is a longitudinal sectional elevational view of a change speed transmission gearing with this invention associated therewith, and Figure 2 is an enlarged detail sectional view taken substantially on line 2—2 in Figure 1.

The type of transmission gearing herein illustrated includes a driving shaft 10 connected to and driven by the motor (not shown) and a driven shaft 11 connected as usual to the rear wheels of the motor vehicle. The driving shaft 10 carries a driving gear 12 which meshes with a gear 13 on a counter shaft 14. The driven shaft 11 has keyed thereto longitudinally slidable gears 15 and 16 adapted to mesh with gears 17 and 18 carried by counter shaft 14 for low and intermediate speeds respectively. Counter shaft 14 is also provided with a gear 19, an idler gear 20 being provided whereby reverse may be obtained through slidable gear 15.

Gear 16 is provided with a plurality of teeth 21 constituting the member or means on the driven shaft for coupling the driven shaft to the driving shaft for direct drive or high speed. Cooperating with the gear 16 is a clutch member 22 having external teeth 23 adapted to mesh with the teeth 21 for connecting the shafts 10 and 11. The member 22 is also provided with a ratchet gear 24 housed within a clutch drum 25, this drum constituting an integral portion of the driving shaft and being positioned next to the gear 12 and of a relatively greater diameter than said gear.

The ratchet gear is provided with a number of cam surfaces 26 which cooperate with the inner peripheral face of the drum to retain rollers 27 in the recesses formed by these elements, the resulting construction forming an overrunning or one way clutch. For centering the member 22 relative to the drum and for aligning the shafts 10 and 11, the driven shaft is provided with an end portion 28 received within a bore 29 of the driving shaft and upon which the member 22 is rotatably mounted. The member 22 by virtue of its contact or frictional engagement with the aforesaid end portion 28 tends to rotate in synchronism or harmony with the gear 16 when it and the gear are out of clutched relation and it is not being driven by the driving shaft 10. As a result of this arrangement, engagement of the gear 16 with the member 22 may be readily effected.

With the above described construction, rotation of the shaft 10 in one direction will cause the rollers 27 to be wedged between the cam surfaces 26 and the inner face of the drum whereupon clutch member 22 will be coupled to shaft 10 for rotation therewith. It will be obvious however that clutch member 22 will be permitted to rotate freely or independently of shaft 10 in the normal direction of rotation of the shaft.

As shown in Figure 2, spring pressed plungers 30 are mounted in the ratchet gear and are designed to exert pressure upon the rollers so as constantly to force them into the narrow ends of the wedge-shaped recesses formed by the cam surfaces 26 and the inner face of the clutch drum 25. This is to insure the efficient operation of the clutch and to prevent slipping of the ratchet gear relative to the clutch drum due to irregularities in the size of the rollers or because of wear upon the different parts, the plungers functioning automatically to compensate for such defects in the clutch. Preferably the drum is provided with a cover 31 for retaining the ratchet gear and the rollers in place while a roller bearing 32 is located on the opposite side of the gear 12 from the drum for permitting rotation of the shaft 10.

In operation, gear 16 is adapted to be shifted along driven shaft 11 to bring the toothed portion 21 thereof into engagement with the clutch member 22 for high speed or direct drive and when these parts are in engagement it will be obvious that shaft 11 may be driven by shaft 10 but shaft 11 and consequently the motor vehicle may coast or travel at a speed in excess of that at which shaft 10 is rotated. Inasmuch as the gear 12 which drives counter shaft 14 through gear 13 is carried directly by driving shaft 10, first and second speeds and reverse will be driven in accordance with the rotation of driving shaft 10, the coasting of the vehicle being permitted only in high speed. Thus the motor of the vehicle may be used as a brake during the other speeds as is now customary.

While an embodiment of the invention has been described and illustrated herein somewhat in detail, it will be readily apparent to those skilled in this art that various changes and modifications may be resorted to without departing from the spirit and scope of this invention and to this end reservation is made to make such changes as may come within the purview of the accompanying claims.

What I claim as my invention is:

1. In a transmission gearing, a driving shaft, a driven shaft, a counter shaft driving gear on said driving shaft, a member journaled on said driven shaft, a second member on said driven shaft engageable with said first mentioned member for direct drive and a non-reversible clutch forming a driving connection between said driving shaft and first-mentioned member including a clutch drum secured to the end of the driving shaft adjacent the countershaft driving gear on said shaft and of a size relatively larger than said gear, and a ratchet carried by said first mentioned member and housed within said clutch drum.

2. In a transmission gearing, a driving shaft, a driven shaft, a counter shaft driving gear on said driving shaft, and means for coupling said driving and driven shafts for direct drive, said means including a clutch member rotatively journalled on said driven shaft, a clutch drum carried by said driving shaft between the countershaft driving gear on said shaft and said clutch member and cooperating with said clutch member to form a one way clutch between said driving and driven shafts.

3. In a transmission gearing, a driving shaft, a driven shaft, a counter shaft driving gear on said driving shaft, and means for coupling said driving and driven shafts for direct drive, said means including a clutch member rotatively journalled on said driven shaft, and having a ratchet gear forming an integral part thereof, a clutch drum carried by said driving shaft between the countershaft driving gear on said drive shaft and said clutch member and cooperating with said ratchet gear to form a one way clutch between said driving and driven shafts.

4. In a transmission gearing, a driving shaft provided with an enlarged end chambered to form a clutch drum, said shaft being provided with a bore in its enlarged end and being provided externally with a gear of less diameter than the said chamber, a driven shaft provided with a reduced end portion journaled in said bore, a clutch member journaled on the end of said driven shaft having a ratchet portion arranged within said chamber and a toothed portion projecting laterally from said chamber, and a second clutch member splined to said driven shaft for engagement with the toothed portion on said first mentioned clutch member.

5. In a transmission gearing, a driving shaft, a driven shaft, a countershaft driving gear on said driving shaft, a clutch drum of greater diameter than said countershaft driving gear formed on the end of said driving shaft, a clutch member journaled on said driven shaft and having a portion arranged within said clutch drum and a portion projecting therefrom, means providing a one-way driving connection between said clutch drum and the portion of said clutch member arranged within said clutch drum, and a second clutch member on said driven shaft arranged to be connected to the projecting portion of said first mentioned clutch member to be directly driven thereby.

6. In combination, a driven shaft, a member splined on said shaft for rotation with the same, a second member engageable with the first mentioned member to drive the same and adapted to drive directly said first mentioned member only, said first mentioned member being movable into and out of engagement with said second member, a driving means for said second member, a connection between said driving means and said second member permitting relative rotation of said driving means and said second member in one direction, and means tending to synchronize the rotation of the two members when the latter are out of engagement with each other and when said second member is not being driven by said driving means.

7. In combination, driving and driven shafts, a member splined on said driven shaft, a second member engageable with the first mentioned member to drive the same and adapted to drive directly said first mentioned member only, said first mentioned member being movable into and out of engagement with said second member, a one-way driving connection between said driving shaft and said second member, and means tending to synchronize the rotation of the two members when the latter are out of engagement with each other and said second member is not being driven by said driving shaft.

8. In combination, driving and driven shafts, interengaging clutch members, one of said members being coupled to said driven shaft and the other member being adapted to drive directly said one clutch member only, a one-way driving connection between said other member and the driving shaft, and means tending to synchronize the rotation of said clutch members when the latter are out of engagement with each other and said driving and driven shafts are rotating relative to each other.

9. In combination, a driven shaft, a gear splined on said driven shaft, a clutch member engageable only with said gear to drive the same, a driving shaft, a one-way driving connection between said driving shaft and said clutch member, and means tending to synchronize the rotation of said clutch member and said gear when said clutch member and gear are disengaged and said clutch member is not being driven by said driving shaft.

10. In a transmission gearing, a driving shaft, a driven shaft, a countershaft driving gear on said driving shaft, a member journaled on said driven shaft, a second member on said driven shaft engageable with said first mentioned member for direct drive, and a non-reversible clutch forming a driving connection between said driving shaft and first mentioned member.

11. In a transmission gearing, a driving shaft, a driven shaft, a countershaft driving gear on said driving shaft, and means for coupling said driving and driven shafts for direct drive, said means including a clutch member rotatably journaled on said driven shaft, and a clutch drum carried by said driving shaft and cooperating with said clutch member to form a one-way clutch between said driving and driven shafts.

12. In a transmission gearing, a driving shaft, a driven shaft, a clutch drum on the end of said driving shaft, a clutch member journaled on said driven shaft and having a portion arranged within said clutch drum and a portion projecting therefrom, means providing a one-way driving connection between said clutch drum and the portion of said clutch member arranged within said clutch drum, and a second clutch member on said driven shaft arranged to be connected to the projecting portion of said first mentioned clutch member to be directly driven thereby.

CLAUDE E. FURGASON.